(12) United States Patent
Liu et al.

(10) Patent No.: US 11,420,367 B2
(45) Date of Patent: Aug. 23, 2022

(54) FOAM MOLDING PROCESS BY MODIFYING AMORPHOUS PLA

(71) Applicant: Dongguan Hailex New Material Science and Technology Co., Ltd., Dongguan (CN)

(72) Inventors: Dongqi Liu, Guangdong (CN); Hao Yi, Guangdong (CN); Weidong Zhang, Guangdong (CN); Runhong Liu, Guangdong (CN)

(*) Notice: Subject to any disclaimer, the term of this patent is extended or adjusted under 35 U.S.C. 154(b) by 0 days.

(21) Appl. No.: 16/952,106

(22) Filed: Nov. 19, 2020

(65) Prior Publication Data

US 2021/0069947 A1  Mar. 11, 2021

(51) Int. Cl.
| | |
|---|---|
| *B29C 44/00* | (2006.01) |
| *B29C 44/08* | (2006.01) |
| *B29C 44/10* | (2006.01) |
| *B29C 44/34* | (2006.01) |
| *B29K 105/04* | (2006.01) |

(52) U.S. Cl.
CPC ........ *B29C 44/348* (2013.01); *B29C 44/3446* (2013.01); *B29K 2105/041* (2013.01)

(58) Field of Classification Search
CPC ............. B29C 44/348; B29C 44/3446; B29K 2105/041; B29K 2067/046; C08J 9/0066; C08J 9/122; C08J 9/16; C08J 9/232; C08J 2201/026; C08J 2205/044; C08J 2367/04

See application file for complete search history.

(56) References Cited

U.S. PATENT DOCUMENTS

| | | | | |
|---|---|---|---|---|
| 8,268,901 | B2* | 9/2012 | Britton | C08L 67/04 521/182 |
| 10,669,389 | B2* | 6/2020 | Uchiyama | C08J 9/0066 |
| 2012/0009420 | A1* | 1/2012 | Pawloski | B29C 44/348 252/500 |
| 2014/0336289 | A1* | 11/2014 | Shinohara | C08J 9/18 521/60 |

\* cited by examiner

*Primary Examiner* — Kara B Boyle
(74) *Attorney, Agent, or Firm* — Novoclaims Patent Services LLC; Mei Lin Wong

(57) ABSTRACT

A process of microcellular foam molding an article includes using a modifier to modify properties of amorphous PLA, pouring the modified amorphous PLA into a high pressure vessel, dissolving an SCF in the high pressure vessel to impregnate the modified amorphous PLA in the high pressure vessel which is configured to allow the SCF to effuse through, forming foamed pellets, conveying the foamed pellets to a mold in a second vessel filled with water or oil, heating the second vessel, and cooling the second vessel until a foamed article is finished in the mold.

11 Claims, 2 Drawing Sheets

FOAM MOLDING PROCESS BY MODIFYING AMORPHOUS PLA

BACKGROUND OF THE INVENTION

1. Field of the Invention

The invention relates to microcellular foam molding and more particularly to a method of microcellular foam molding an article by modifying amorphous polylactic acid (PLA).

2. Description of Related Art

PLA is biodegradable material. However, PLA has a very low strength in a molten state. Thus, it is impossible of foaming PLA.

For modifying properties of PLA, many documents are proposed.

Biopolymer 4060D commercially available from Natureworks LLC of Minnetonka, Minn. is a type amorphous PLA and have 0% of crystallinity through the manufacturing process. Further, Biopolymer 4060D can be quickly degraded and thus does not pollute the environment. However, amorphous PLA has a lower strength in a molten state than that of PLA. Thus, it is impossible of foaming amorphous PLA for producing articles.

Thus, the need for improvement still exists.

SUMMARY OF THE INVENTION

It is therefore one object of the invention to provide a process of microcellular foam molding an article comprising the steps of using a modifier to modify properties of amorphous polylactic acid (PLA) wherein the modifier is chain extender, nucleating agent or both; pouring the amorphous PLA having modified properties into a high pressure vessel; dissolving a supercritical fluid (SCF) in the high pressure vessel to impregnate the amorphous PLA having modified properties at a predetermined pressure for a first predetermined period of time in the high pressure vessel which is configured to allow the SCF to effuse through; forming foamed pellets; conveying the foamed pellets to a mold in a second vessel filled with water or oil; heating the second vessel at a predetermined temperature for a second predetermined period of time wherein the predetermined temperature is in the range from 60° C. to 90° C. and the second predetermined period of time is in the rage from 1 min to 14 min; and cooling the second vessel until a foamed article is finished in the mold.

Preferably, 1 wt %-1.5 wt % of the chain extender is used to modify the properties of the amorphous PLA when the chain extender is involved.

Preferably, the chain extender is polyester chain extender or epoxy chain extender.

Preferably, 1 wt %-2 wt % of the nucleating agent is used to modify the properties of the amorphous PLA when the nucleating agent is involved.

Preferably, the nucleating agent is at least one of calcium carbonate, talcum powder, mica powder, clay, zinc oxide powder, and titanium dioxide.

Preferably, step (1) further comprises the sub-steps of mixing the modifier with the PLA to obtain a mixture, conveying the mixture to an extrusion machine to extrude the mixture, and cutting the extruded mixture to obtain a plurality of blocks.

Preferably, the predetermined pressure is in the range from 1 Mpa to 6 Mpa and the first predetermined period of time is in the rage from 10 min to 100 min.

Preferably, the effused SCF is 8 wt %-20 wt %.

Preferably, the SCF is carbon dioxide SCF or nitrogen SCF.

The above and other objects, features and advantages of the invention will become apparent from the following detailed description taken with the accompanying drawings.

DETAILED DESCRIPTION OF THE INVENTION

Figure 1:
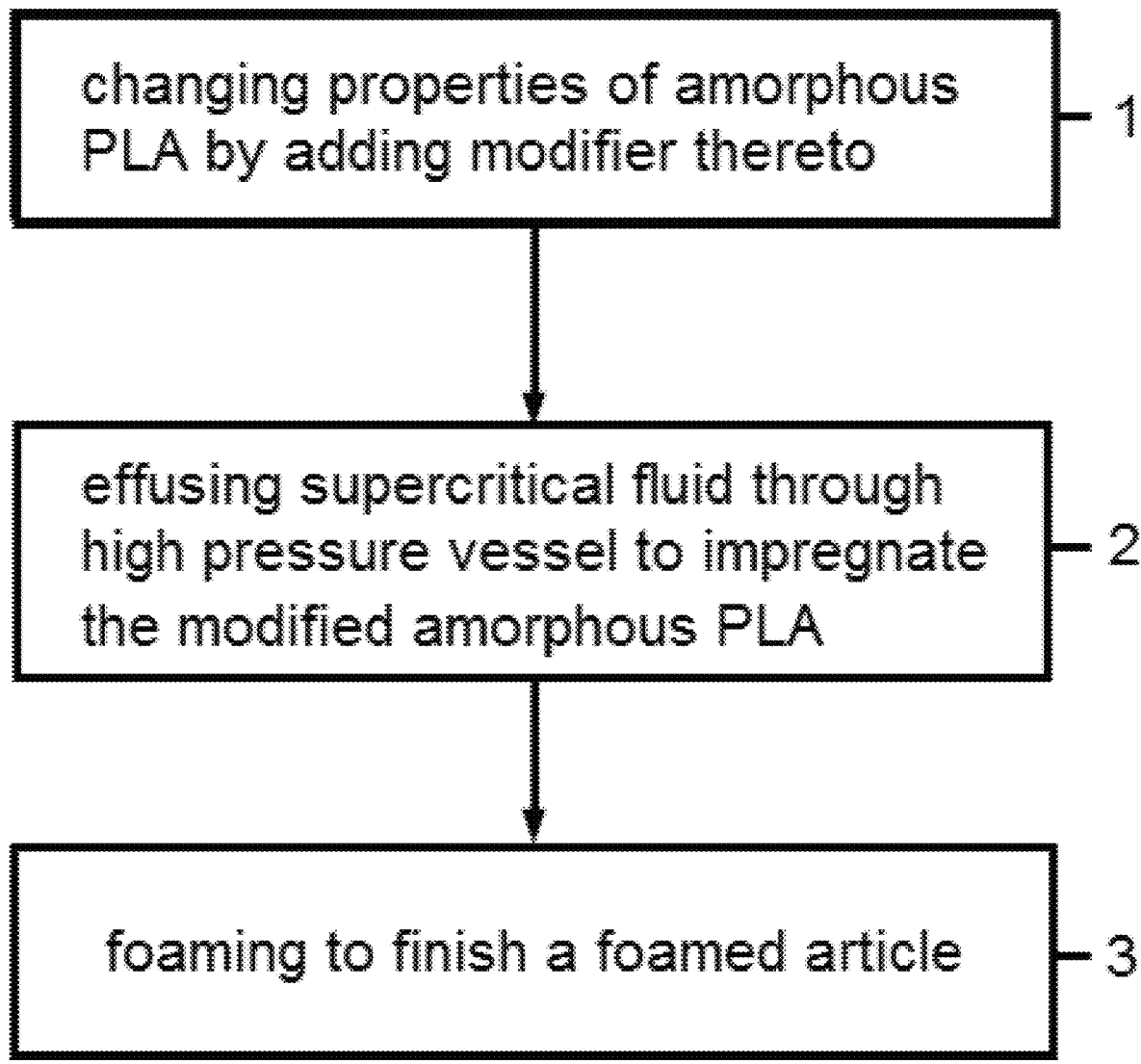
FIG. 1 is a perspective view of a microcellular foam molding process by modifying properties of amorphous PLA according to a first preferred embodiment the invention.
Figure 2:
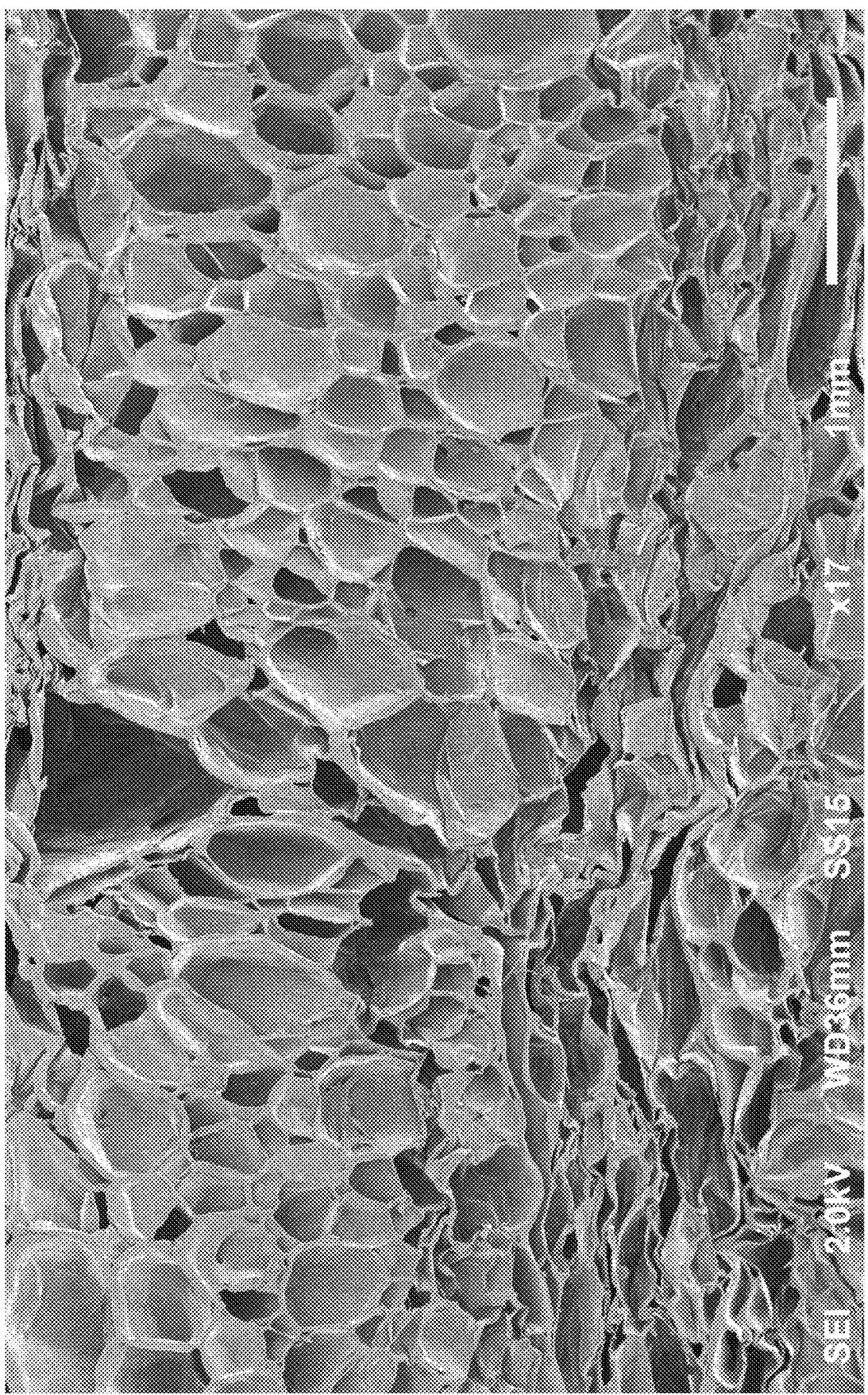
FIG. 2 is a transmission electron microscopy (TEM) photograph of the foamed article produced by the invention.

Referring to FIGS. 1 to 2, a microcellular foam molding process by modifying properties of amorphous PLA in accordance with a first preferred embodiment of the invention is illustrated by comprising the following steps as discussed in detail below.

Step 1: using a modifier to modify properties of amorphous polylactic acid (PLA) having 0% of crystallinity. One specific example of a suitable amorphous PLA that may be used in the invention is Biopolymer 4060D which is commercially available from Natureworks LLC of Minnetonka, Minn. The modifier is chain extender, nucleating agent or both.

Step 2: pouring the amorphous PLA having modified properties into a high pressure vessel, dissolving a supercritical fluid (SCF) in the high pressure vessel to impregnate the amorphous PLA having modified properties at a predetermined pressure for a first predetermined period of time in the high pressure vessel which is configured to allow the SCF to effuse through, and forming foamed pellets (e.g., half-finished products).

Step 3: conveying the foamed pellets to a mold in a second vessel filled with water or oil and heating at a predetermined temperature (e.g., 60-90° C.) for a second predetermined period of time (e.g., 1-14 min), and cooling the second vessel for a third predetermined period of time until a foamed article is finished in the mold. The article has a density of 50-150 g/L and a plurality of bubbles having a bore of 0.1-2 mm (see FIG. 2).

It is envisaged by the invention that the amorphous PLA, as the material, does not have a crystal structure, has 0% of crystallinity through the process, is biodegradable, and does not pollute the environment.

It is envisaged by the invention that the amorphous PLA having modified properties including molecular link extension, increased number of molecules, decreased volume of SCF absorbed by the amorphous PLA, and glass conversion temperature decreased to 55-60° C. Most importantly, heating the second vessel filled with water or oil at 60-90° C. which is slightly higher than the glass conversion temperature for 1-14 minutes can produce an article having excellent appearance and physical properties.

Step 1 further comprises the sub-steps of mixing the modifier with the PLA to obtain a mixture, conveying the mixture to an extrusion machine to extrude the mixture, and cutting the extruded mixture to obtain a plurality of blocks.

The extrusion machine is single threaded or double threaded. The cutting is performed directly or in water and the blocks have a length of 1.5 cm.

A microcellular foam molding process by modifying properties of amorphous PLA in accordance with a second preferred embodiment of the invention is illustrated by comprising the steps of using a modifier to modify properties of amorphous PLA having 0% of crystallinity, pouring the amorphous PLA having modified properties into a mold in a high pressure vessel, dissolving SCF in the mold to impregnate the amorphous PLA having modified properties at a predetermined pressure for a first predetermined period of time in the mold which is configured to allow the SCF to effuse through, forming foamed pellets (e.g., half-finished products), conveying the mold to a second vessel filled with water or oil, heating at a predetermined temperature (e.g., 60-90° C.) for a second predetermined period of time (e.g., 1-14 min), and cooling the second vessel until a foamed article is finished in the mold. The article has a density of 50-150 g/L and a plurality of bubbles having a bore of 0.1-2 mm (see FIG. 2). It is noted that pre-foaming and final foaming steps are involved in the mold and a precise mold is thus required.

A microcellular foam molding process by modifying properties of amorphous PLA in accordance with a third preferred embodiment of the invention is illustrated by comprising the steps of using a modifier to modify properties of amorphous PLA having 0% of crystallinity, pouring the amorphous PLA having modified properties into a high pressure vessel, dissolving SCF in the high pressure vessel to impregnate the amorphous PLA having modified properties at a predetermined pressure for a first predetermined period of time in the high pressure vessel which is configured to allow the SCF to effuse through, forming foamed pellets (e.g., half-finished products), conveying the high pressure vessel to a mold in a second vessel filled with water or oil, heating at a predetermined temperature (e.g., 60-90° C.) for a second predetermined period of time (e.g., 1-14 min), and cooling the second vessel until a foamed article is finished in the mold. The article has a density of 50-150 g/L and a plurality of bubbles having a bore of 0.1-2 mm (see FIG. 2). It is noted that only a final foaming step is involved in the mold and a precise mold is not required.

Preferably, 1 wt %-1.5 wt % of the chain extender is used to modify properties of amorphous PLA when the chain extender is involved.

Preferably, 1 wt %-2 wt % of nucleating agent is used to modify properties of amorphous PLA when the nucleating agent is involved.

Preferably, the chain extender is polyester chain extender or epoxy chain extender, and the nucleating agent is at least one of calcium carbonate, talcum powder, mica powder, clay, zinc oxide powder, and titanium dioxide.

Preferably, the predetermined pressure is 1-6 Mpa and the first predetermined period of time is 10-100 min.

Preferably, the effused SCF is 8 wt %-20 wt %. More preferably, the effused SCF is 15 wt %-17.5 wt %.

Preferably, the SCF is carbon dioxide SCF or nitrogen SCF.

Preferably, the predetermined period of time for cooling is 1-10 min.

The finished foam products of the Invention are applicable to containers of fresh food or the like. The density of the finished foam products can be changed based on requirements.

Embodiment 1: using 1 wt % of polyester chain extender and 1 wt % of calcium carbonate to modify properties of amorphous PLA, pouring the amorphous PLA having modified properties into a mold in a high pressure vessel, dissolving 16% of SCF in the high pressure vessel to impregnate the amorphous PLA in the high pressure vessel which is configured to allow the SCF to effuse through at 3 Mpa for 20 min, forming foamed pellets, conveying the foamed pellets to a mold in a second vessel filled with water or oil and heating at 80° C. for 2 min, and cooling the second vessel for 2 min until a foamed article is finished in the mold. The articles have the same compression strain similar to EPP, increased compression ratio and bending strength based on a test report complied with DIN53421 or ISO1209.

Embodiment 2: the same as embodiment 1 except that the mold is placed in a second vessel filled with water or oil and foaming is performed at 55° C. But the foamed products are not acceptable due to low joining force among particles, great joining defects and decreased physical and mechanical properties.

Embodiment 3: the same as embodiment 1 except that the mold is placed in a second vessel filled with water or oil and foaming is performed at 100° C. But the foamed products are not acceptable due to high contraction of particles, damaged surfaces of the particles, ugly appearance and deformed shapes.

Embodiment 4: the same as embodiment 1 except that the mold is placed in a second vessel filled with water or oil and foaming is performed for 30 seconds. But the foamed products are not acceptable due to insufficient effusion in particles and low joining force among particles.

Embodiment 5: the same as embodiment 1 except that 25% of SCF is dissolved for effusion. But the foamed products are not acceptable due to excessive high expansion of particles and low density.

Embodiment 6: the same as embodiment 1 except that 5% of SCF is dissolved for effusion. But the foamed products are not acceptable due to excessive low expansion of particles and low joining force among particles.

Embodiment 7: the same as embodiment 1 except that the effusion is performed at 0.5 Mpa. But the foamed products are not acceptable due to no foaming agent absorption in particles and no foamed particles.

Embodiment 8: the same as embodiment 1 except that the effusion is performed at 3 Mpa for 5 min. But the foamed products are not acceptable due to in sufficient foaming agent absorption in particles and few foamed particles.

Embodiment 9: the same as embodiment 1 except that the 0.3 wt % of polyester chain extender and 0.3 wt % of calcium carbonate to modify properties of amorphous PLA. But the foamed products are not acceptable due to low mechanical strength, excessive high density and rough surfaces.

While the invention has been described in terms of preferred embodiments, those skilled in the art will recognize that the invention can be practiced with modifications within the spirit and scope of the appended claims.

What is claimed is:

1. A process of microcellular foam molding an article comprising the steps of:
   (1) using a modifier to modify properties of amorphous polylactic acid (PLA) wherein the modifier is chain extender, nucleating agent or both, thereby forming a modified amorphous PLA;
   (2) pouring the modified amorphous PLA into a pressure vessel;
   (3) dissolving a supercritical fluid (SCF) in a pressure vessel and effusing the SC to the modified amorphous PLA to impregnate the modified amorphous PLA at a predetermined pressure for a first predetermined period of time in the pressure vessel, thereby forming impregnated, modified amorphous PLA;

(4) allowing the impregnated, modified amorphous PLA to expand, thereby forming foamed modified amorphous PLA;

(5) conveying the foamed modified amorphous PLA to a mold in a second vessel filled with water or oil;

(6) heating the second vessel at a predetermined temperature for a second predetermined period of time wherein the predetermined temperature is in the range from 60° C. to 90° C. and the second predetermined period of time is in the range from 1 min to 14 min; and (7) cooling the second vessel until a microcellular foamed article is formed in the mold.

2. The process of claim 1, wherein the modifier is the chain extender and 1 wt %-1.5 wt % of the chain extender by percentage weight of total weight is used to modify the properties of the amorphous PLA.

3. The process of claim 1, wherein the chain extender is polyester chain extender or epoxy chain extender.

4. The process of claim 1, wherein the modifier is the nucleating agent and 1 wt %-2 wt % of the nucleating agent by percentage weight of total weight is used to modify the properties of the amorphous PLA.

5. The process of claim 1, wherein the nucleating agent is at least one of calcium carbonate, talcum powder, mica powder, clay, zinc oxide powder, and titanium dioxide.

6. The process of claim 1, wherein step (1) further comprises the sub-steps of mixing the modifier with the PLA to obtain a mixture, conveying the mixture to an extrusion machine to extrude the mixture, and cutting the extruded mixture to obtain the modified amorphous PLA in a block form.

7. The process of claim 1, wherein the predetermined pressure is in the range from 1 Mpa to 6 Mpa and the first predetermined period of time is in the rage from 10 min to 100 min.

8. The process of claim 1, wherein amount of SCF impregnated into the modified amorphous PLA is 8 wt %-20 wt % by percentage weight of a total weight of the modified amorphous PLA.

9. The process of claim 1, wherein the SCF is carbon dioxide SCF or nitrogen SCF.

10. The process of claim 1, wherein step (1), the amorphous PLA is in pellet form, and in step (4), the foamed modified amorphous PLA is a foamed pellet.

11. A process of microcellular foam molding an article comprising the steps of:

(1) pouring amorphous polylactic acid (PLA) into a mold, and using a modifier to modify properties of the PLA in the mold wherein the modifier is chain extender, nucleating agent or both, thereby forming a modified amorphous PLA;

(2) placing the modified amorphous PLA in the mold into a pressure vessel;

(3) dissolving a supercritical fluid (SCF) in the pressure vessel and effusing the SCF to the modified amorphous PLA to impregnate the modified amorphous PLA at a predetermined pressure for a first predetermined period of time in the pressure vessel, thereby forming impregnated, modified amorphous PLA;

(4) allowing the impregnated, modified amorphous PLA to expand, thereby forming foamed modified amorphous PLA;

(5) conveying the foamed modified amorphous PLA to a second vessel filled with water or oil;

(6) heating the second vessel at a predetermined temperature for a second predetermined period of time wherein the predetermined temperature is in the range from 60° C. to 90° C. and the second predetermined period of time is in the rage from 1 min to 14 min; and (7) cooling the second vessel until a microcellular foamed article is formed in the mold.

\* \* \* \* \*